(12) United States Patent
Cook

(10) Patent No.: US 9,097,162 B2
(45) Date of Patent: Aug. 4, 2015

(54) LOCOMOTIVE AND TRANSIT SYSTEM EFFICIENCY AND EMISSIONS IMPROVEMENTS

(71) Applicant: David Cook, Fullerton, CA (US)

(72) Inventor: David Cook, Fullerton, CA (US)

( * ) Notice: Subject to any disclaimer, the term of this patent is extended or adjusted under 35 U.S.C. 154(b) by 0 days.

(21) Appl. No.: 14/216,969

(22) Filed: Mar. 17, 2014

(65) Prior Publication Data

US 2014/0260217 A1  Sep. 18, 2014

Related U.S. Application Data

(60) Provisional application No. 61/790,771, filed on Mar. 15, 2013.

(51) Int. Cl.
| | |
|---|---|
| *F01N 3/00* | (2006.01) |
| *F01N 3/20* | (2006.01) |
| *B61C 3/02* | (2006.01) |
| *B61C 17/02* | (2006.01) |
| *B61D 15/06* | (2006.01) |
| *F01N 3/10* | (2006.01) |
| *F01N 13/08* | (2010.01) |
| *F01N 13/10* | (2010.01) |
| *F01N 13/18* | (2010.01) |
| *F01N 13/00* | (2010.01) |

(52) U.S. Cl.
CPC ... *F01N 3/20* (2013.01); *B61C 3/02* (2013.01); *B61C 17/02* (2013.01); *B61D 15/06* (2013.01); *F01N 3/103* (2013.01); *F01N 3/2066* (2013.01); *F01N 13/0093* (2014.06); *F01N 13/085* (2013.01); *F01N 13/10* (2013.01); *F01N 13/1816* (2013.01); *F01N 2340/02* (2013.01); *F01N 2340/06* (2013.01); *Y02T 10/24* (2013.01); *Y02T 30/12* (2013.01)

(58) Field of Classification Search
CPC ..... F01N 3/0842; F01N 3/035; F01N 3/0814; F01N 3/2066; F01N 13/02; F01N 9/002; F02D 41/029; F02D 41/0275
USPC .................................. 60/295, 301; 105/62.1
See application file for complete search history.

(56) References Cited

U.S. PATENT DOCUMENTS

| | | | | |
|---|---|---|---|---|
| 7,624,569 | B2 * | 12/2009 | Driscoll et al. ............... | 60/285 |
| 2006/0096275 | A1 * | 5/2006 | Robel et al. ................... | 60/286 |
| 2014/0044612 | A1 * | 2/2014 | Baig et al. ..................... | 422/600 |
| 2014/0116027 | A1 * | 5/2014 | Ancimer ....................... | 60/274 |
| 2014/0237996 | A1 * | 8/2014 | Yezerets et al. .............. | 60/295 |
| 2014/0277862 | A1 * | 9/2014 | Pritchard et al. ............. | 701/19 |
| 2014/0318108 | A1 * | 10/2014 | Boggs ............................ | 60/311 |

* cited by examiner

*Primary Examiner* — Thomas Denion
*Assistant Examiner* — Patrick Maines
(74) *Attorney, Agent, or Firm* — Richards Patent Law P.C.

(57) ABSTRACT

A system including: a HEP generator creating HEP generator exhaust; a prime engine creating prime engine exhaust; a SCR system through which the prime engine exhaust and the HEP generator exhaust run; an HEP generator exhaust pipe running from the HEP generator to an exhaust mixing duct where the HEP generator exhaust is mixed with the prime engine exhaust, wherein the HEP generator exhaust pipe discharges into the exhaust mixing duct at a distance from the SCR less than ten times the diameter of the exhaust mixing duct; and a single urea injector injecting urea into the HEP generator exhaust pipe at a distance from the exhaust mixing duct of more than ten diameters of the HEP generator exhaust pipe.

1 Claim, 7 Drawing Sheets

LOCOMOTIVE AND TRANSIT SYSTEM EFFICIENCY AND EMISSIONS IMPROVEMENTS

CROSS-REFERENCE TO RELATED APPLICATIONS

This application claims the benefit of U.S. Provisional Application No. 61/790,771 filed on Mar. 15, 2013, the entirety of which is incorporated herein by reference.

BACKGROUND OF THE INVENTION

The first portion of the background relates to passenger locomotive HEP and prime exhaust merging into a single main SCR system for lower emissions. Passenger locomotives are distinct from freight locomotives in that they have to provide not only tractive power from the prime engine to propel the locomotive, but also have to provide hotel power to provide lights and climate control for the passenger cars. Providing this hotel power is typically done with a second diesel engine and generator called a head-end power (HEP) generator.

In 2010 Metrolink tested a retrofit selective catalytic reduction (SCR) system on its F59PH locomotive SCAX 865. This system only treated the exhaust gasses from the 3000 hp main engine used for propulsion, the 250 kW HEP generator was not modified to lower its emissions. This demonstration program was funded by several agencies including the South Coast AQMD and CARB. It was designed, built and installed by Engine, Fuel and Emissions Engineering, Inc out of Rancho Cordova, Calif.

Two particular challenges came up in this testing program. The first challenge was low exhaust temperatures at throttle positions below notch 3, and the second was the challenge of getting the UREA fluid to mix well with the exhaust gasses.

SCR systems from this same company will typically have NOx reduction efficiencies above 95%. Two conditions are required to meet this high efficiency level. The catalyst must be above a minimum operating temperature and the urea fluid must be vaporized and well mixed with the exhaust gasses. The base engine in this test program was tested at 9 g/(hp-hr) of NOx and the SCR system was able to reduce that to 2.6 g/(hp-hr), an overall emissions reduction efficiency of 71%. In order to achieve Tier 4 emissions levels of 1.3 g/(hp-hr) it would need an overall efficiency of 85%, which is well within the capabilities of the technology. Typical SCR installations would have a long mixing pipe that the exhaust gas and urea mixture would flow through before reaching the SCR substrates where the NOx reduction happens. A typical mixing duct has a length equal to 10 times its diameter.

Because of the tight packaging constraints of the locomotive, the SCR system was mounted immediately above the engine turbo charger outlet. At high loads and temperatures, the efficiency of this system was slightly above 80% instead of over 95% typical for an SCR system at operating temperature. These low efficiency numbers at higher operating temperatures illustrate the severity of the urea mixing issue and how it limited the overall efficiency of the SCR system.

In addition to poor urea mixing, low exhaust temperatures started to significantly affect the SCR system emissions reduction efficiency below throttle notch 4; at notch 3 the efficiency was reduced to 73% and by notch 2 it was down to 28%. At notch 1 and at idle the SCR system was inactive due to the SCR catalyst temperature being below the temperature required for thermal dissociation of the urea. The system was programmed to shut off urea injection under these conditions.

It is these very low efficiencies at lower temperatures that brought the overall system efficiency down to 71% when at higher loads it was typically over 80%.

What is needed is an economical retrofit system for existing passenger locomotives that will solve these two system shortcomings so that the system will reduce NOx emissions below future EPA Tier 4 levels. It would also benefit the end user if this system could also help reduce the NOx emissions of the HEP generator.

The second portion of the background relates to combined cooling systems for PM emissions compliance and thermal efficiency. In the railroad industry, it has been a technique to reduce idling for many years by adding what is called an auxiliary engine to a locomotive to reduce the amount of time the main engine is idling. As far back as 1984, the Locomotive Cyclopedia had an advertisement for a system by Microphor. This reduction in main engine idle time saves wear and tear on the main engine, reduces emissions and saves fuel. When these auxiliary engines are liquid cooled they will transfer heat to the main engine coolant by transferring heat from both the auxiliary engine exhaust and the auxiliary engine coolant. These engines are typically very small, under 25 kW and these have typically been installed on freight locomotives.

As previously stated, passenger locomotives are distinct from freight locomotives in that they have to provide not only tractive power from the prime engine to propel the locomotive, but also have to provide hotel power to provide lights and climate control for the passenger cars. Providing this hotel power is typically done with a second diesel engine and generator called a HEP generator. Unlike auxiliary engines used for engine heating that are under 25 kW in power, HEP generators used in passenger locomotives are typically 250 kW or more. Currently Metrolink is specifying 600 kW HEP generators for new locomotives as they expect to be pulling longer trains with 10 passenger cars in the future.

Locomotives emissions requirements under EPA guidelines are different for HEP generators and auxiliary engines. A passenger locomotive engine that only provides hotel power does not fall under the locomotive emissions rules, but falls under off-road rules. If this engine performs any function beyond providing hotel power it will lose this exception and its emissions will somehow have to be combined with the prime engine emissions when emissions testing the locomotive engine. To this day, there has not been a passenger locomotive prime engine and HEP engine certified together; but the EPA regulations clearly acknowledge that a locomotive can be certified under an alternative duty cycle that would be developed for this specific application.

HEP generators are typically high speed diesel engines as used in class 8 trucks and capable of NOx emissions 85% below the locomotive Tier 4 standard and PM emissions 66% below the locomotive Tier 4 standard with the use of both an SCR system and a particulate filter system.

Engine, Fuel and Emissions Engineering Inc. has demonstrated a Compact SCR system for the EMD main engine that has the potential to reduce NOx emissions below Tier 4 levels with some further development. This Compact SCR system also has a section that acts as an oxidation catalyst that reduces particulate matter (PM). It is likely that this system with modern low oil consumption piston rings and liners will achieve PM emissions below Tier 3 levels, but not below Tier 4. Because of the scavenging nature of uniflow 2 stroke engines, they are not tolerant of significant increases in exhaust back pressure and it is impractical to put a particulate filter on them. This is a major reason why the 2 stroke truck engines were phased out by Detroit Diesel when the EPA starting imposing emissions limits on diesel truck engines.

It could be possible to economically retrofit older passenger locomotives to meet Tier 4 PM emissions levels if there was a practical way to combine the very low PM emissions level of the 4 stroke diesel particulate filter (DPF) equipped HEP engine with the slightly higher than Tier 4 PM emissions of an updated EMD 2 stroke prime engine.

The third portion of the background relates to combined high temperature and low temperature coolant loops with a thermal reservoir. Locomotives consume almost 5% of their fuel when powering the engine cooling fans. This energy could be saved by using ram air cooling, but that solution is not practical in rail applications for several reasons. First, freight trains can be moving slowly at high power for extended periods of time as when climbing a hill or starting from a stop with a very long train. Second, locomotives typically have to travel in either direction so the air ducting system would have to be bidirectional.

Passenger locomotives in commuter rail service do not have the issue of low-speed high-load operation for extended times. The passenger application is actually a higher speed application with frequent stops. With a high average speed the passenger locomotive would appear to be a good candidate for ram air cooling. But there is one issue. The higher speed operation of the passenger train where adequate ram air cooling is available does not occur when the locomotive is generating the most waste heat. The time when the most engine cooling is needed is when leaving the station after a stop and accelerating up to speed. This opposite timing of high cruising speeds and high engine loading makes using ram air cooling impractical even for this high average speed locomotive application.

Waste heat recovery is another technology that would be a good fit for passenger locomotives as they consume a lot of fuel and thus have a lot of waste energy to recover. They have steel wheels so the excess weight of the additional waste heat recovery equipment is not as much a detriment as it would be on a rubber tired on-road truck.

With the coming transition to natural gas and hybridization that will require a tender car, even the space is now available to install the needed ducting for bi-directional ram air cooling which could cool the prime engine and the HEP generator. But the opposite timing of high engine loading versus high speed makes it impractical.

What the locomotive system needs is a simple and reliable way to decouple the timing of when waste heat is created from when it can be rejected into the atmosphere.

BRIEF SUMMARY OF THE INVENTION

This application incorporates by reference the entirety of U.S. patent application Ser. Nos. 12/884,162 and 12/884,157.

The first portion of the summary relates to passenger locomotive HEP and prime engine exhaust merging into a single main SCR system for lower emissions. The basis of this invention is to combine the exhaust gases of both the prime engine and the HEP generator and run them together through a single SCR system. This harnesses the typically high exhaust temperature of the highly loaded HEP generator to keep the single main SCR system at operating temperature. This makes the SCR system effective at reducing the prime engine's emissions even when the prime engine is at idle or very low power.

The unique operating characteristics of passenger locomotives have the HEP generator continuously operating at 30% or higher engine loading. There will be instances in normal operations where the prime engine is shut down and the HEP generator is running, but there are no standard passenger operations where the prime engine is running and the HEP generator is not. This would typically only happen if the HEP generator failed and the locomotive was traveling to its next stop and then to a repair facility.

Because the HEP generator is always operating and operating at high exhaust temperatures, the urea needed to treat the prime engine exhaust can be injected first into the HEP engine exhaust and then mixed into the prime engine exhaust when the two exhaust streams converge. Because an HEP generator exhaust pipe will be 8" in diameter or less, and there will be a long exhaust pipe from the HEP generator to the prime engine exhaust, there can be an effective mixing tube length well over the recommended 10 diameters for the urea to fully mix with the HEP generator exhaust.

This allows the use of a single urea injector for both engines, which is simpler and has fewer components that can leak, fail or require maintenance. The SCR control system will determine how much urea is needed for NOx reduction in both the prime and HEP engine exhaust streams and will inject that amount into the HEP exhaust stream.

This also solves the problem of the very short urea mixing pipe between the prime engine and the turbo hatch mounted main SCR. In this case the mixing length is close to one diameter, much less than the recommended 10 diameters.

With an improved exhaust urea mixture, the SCR system efficiency at high loads should approach its higher efficiency potential of 95-98%. With the continuous source of hot HEP generator exhaust mixed with the lower temperature exhaust of the prime engine, the low load SCR system efficiency should also be much improved.

In addition to improving the efficiency of the SCR system for the prime engine, the second locomotive engine is now operating at much lower NOx levels without the need to purchase a second SCR system or urea injector.

This also eliminates the temperature lag of the SCR system when it has been idling for a while. Passenger trains stop every few minutes and total idle time can be up to 3 minutes as a train starts to coast towards a station, decelerates gently as not to topple standing passengers and then sits for a minute as passengers get on and off. As the train pulls away from the station, the power is abruptly brought up to notch 8 to accelerate the train back to cruise speed. For busy commuter trains this could happen 100 times a day. With the current system, the SCR catalyst would take as much as 30 seconds to reach normal operating temperature. At the start of this warm up period the system would not be reducing NOx emissions at all, as the temperature is below the minimum temperature and the SCR controller will not inject urea. During the warm up phase the system would slowly start injecting more urea and the SCR system will start to become more efficient. Unfortunately a good deal of this time where the cold SCR is not working and starting to warm up is when it is needed most as the locomotive is at full power accelerating from a stop. With the HEP generator supplying a constant stream of hot exhaust and urea, the system will remain at or be very close to operating temperature through the entire deceleration, stop, and acceleration cycle.

Another advantage of the HEP generator keeping the SCR warm is the reduction in thermal cycling. With a commuter locomotive making up to 100 stops a day, the SCR substrates and all the metal structure and piping are being thermally cycled and stressed as they cool down at each stop. Using the HEP exhaust reduces the number of heat cycles to one or two cycles a day when the prime engine and HEP generator are combined. This could offer an order of magnitude increase in life of some of the components.

With future hybrid commuter locomotive systems on the horizon, this use of HEP generator exhaust heat will be even more important. Under a hybrid system, the need for power from the prime engine will be reduced or eliminated even sooner; and instead of idling the prime engine, it will be shut down. The locomotive will come into the station with the prime engine off and will likely leave the station under hybrid power without starting the prime engine. Instead of idling for 3 minutes, now the prime engine may be completely shut off for 4 minutes, then started back up and brought to high power. Without the heating of the HEP generator exhaust, the SCR system temperature cycle, length of time at high load operation and reduced SCR efficiency would be even greater.

The second portion of the summary relates to combined cooling systems for PM emissions compliance and thermal efficiency. Due to EPA locomotive regulations for auxiliary engines and hotel power, the HEP generator engine emissions can be combined with the prime engine emissions and be considered for an alternate duty cycle from the EPA. This emissions coupling is a result of using the HEP engine for more than just supplying hotel power which causes it to fall under the emissions requirements of locomotive auxiliary engines.

By eliminating the HEP engines radiator and redirecting the HEP engine coolant through the prime engine, the HEP engine is used as a heat source for both preheating the prime engine for starting, and also to keep it warm in cold weather so that its coolant won't freeze. This coupling of the coolant systems could be accomplished with just some simple piping modifications and a one-way check valve.

Without this system in colder climates, passenger locomotives would require an additional electric or diesel burner subsystem to preheat the prime engine or would use an additional heat exchanger and pump circuit to transfer heat from the HEP coolant to the prime engine coolant. These two approaches take up space and add maintenance requirements.

With the large radiating area of the prime engine and the main locomotive radiator system, it is likely that when the prime engine is idling or off, there will be no need to operate a powered cooling fan to cool the HEP engine. Powered cooling fans for a HEP generator would usually consume 5% or more of the generator output. As a HEP generator can contribute up to 33% of the total fuel consumption, a 5% decrease in HEP generator fuel consumption is a significant fuel and emissions savings.

The third portion of the summary relates to combined high temperature and low temperature coolant loops with a thermal reservoir. In addition to the thermal reservoir, the waste heat from both the low temperature and high temperature circuits are both rejected in a single radiator.

If this system only allowed the addition of ram air cooling, it would recover approximately 5% of wasted fuel energy consumed by the powered cooling fans.

If it additionally allowed waste heat recovery to be implemented it could recover an additional 10% of the fuel energy wasted as heat in the exhaust and jacket water.

As hybridization encourages turning off the main engine some distance before the locomotive reaches the station, this system will reduce the cold slug of engine coolant that a normal engine would get when first started after a sitting for a while.

With only one radiator, it will allow a locomotive to have both a low temperature and high temperature cooling circuit. This low temperature capability allows separate circuit aftercooling which increases power and efficiency and lowers emissions. This low temperature coolant circuit typically required an additional radiator.

Once the air to liquid cooling system has been located on the tender car, the thermal reservoir will allow the locomotive, when disconnected from the tender car, to be operated and moved short distances without the risk of overheating the engine.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
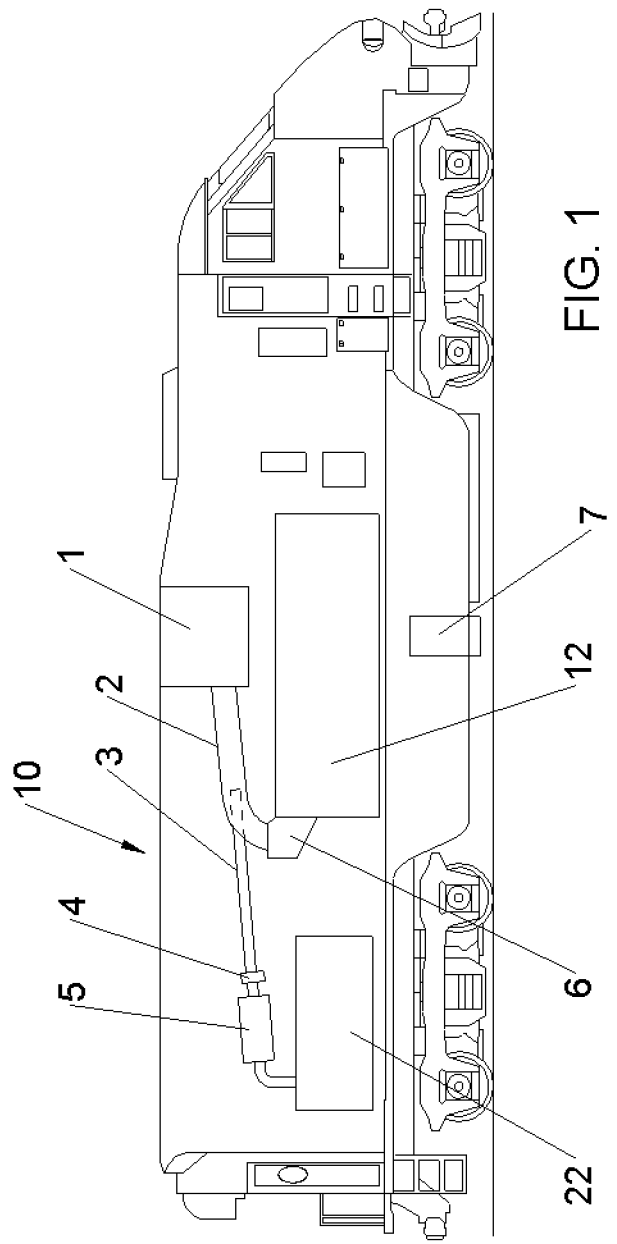
FIG. 1 is a side view of an F59PHI passenger locomotive illustrating the combined exhaust systems feeding a single main SCR unit

To facilitate an understanding of the present disclosure, a number of terms and phrases are defined below:

Diesel particulate filter (DPF): is a device designed to remove diesel particulate matter or soot from the exhaust gas of a diesel engine. Wall-flow diesel particulate filters usually remove 85% or more of the soot, and under certain conditions can attain soot removal efficiencies approaching 100%. Some filters are single-use, intended for disposal and replacement once full. Others are designed to burn off the accumulated particulate either passively through the use of a catalyst or by active means such as a fuel burner which heats the filter to soot combustion temperatures. This is accomplished by engine programming to run (when the filter is full) in a manner that elevates exhaust temperature or produces high amounts of $NO_x$ to oxidize the accumulated ash, or through other methods. This is known as "filter regeneration" and typically specified as either passive or active.

Cleaning and removal of accumulated ash is also required as part of periodic maintenance, and it must be done carefully to avoid damaging the filter.

Modern gasoline engines that use direct injection technology also need particulate filtering. As these units consume gasoline, the common nomenclature for them is a Gasoline particulate filter or GPF. In this document all particulate filtering devices will be generically referred to as a DPF. In any case where a specific type of particulate filter is discussed, it will be specifically named as needed.

Head End Power (HEP): passenger locomotives need hotel power for the passenger car climate control and lights. This is typically provided by a second diesel generator on a locomotive that outputs 480 volts AC at 60 Hertz in the united states, in Canada and Europe HEP power may be provided at a different voltage and frequency.

Particulate Matter (PM): Particulate matter is a criteria pollution emitted from many sources. In this document we will commonly refer to it simply as PM. It could include both diesel soot PM that is considered toxic in California or the type of PM created by the consumption and combustion of lube oil from an engine. While still considered PM as a criteria emission, the PM from lube oil consumption is considered less toxic than diesel soot.

Prime Engine: Locomotives may have several engines. The prime engine is typically the largest engine on the unit and is used mainly for providing tractive power for propelling the train. In a passenger locomotive there is typically a prime engine and an independent HEP engine for providing hotel power. In some cases a passenger locomotive may only have the prime engine and this engine will also provide hotel power in addition to tractive power.

Thermal Reservoir: A device set aside for thermal energy storage that functions similar to an electric capacitor, temporarily storing heat energy by raising the temperature of a unit of mass, and then dissipating that energy by lowering the temperature. A thermal reservoir could use many types of mass, two examples include a large metallic mass such as an engine block or a body of fluid in a holding tank. In some cases this body of fluid could also perform other functions. In one example the thermal reservoir consists of a tank of water, this water could also be the supply of water for water injection in the engine.

The first portion of the detailed description relates to passenger locomotive HEP and prime exhaust merging into a single main SCR system for lower emissions. FIG. 1 illustrates one embodiment of this system on an F59PHI locomotive.

For exhaust system clarity, this drawing has the prime engine 12 reversed with the turbo 6 at the rear end of the engine instead of at the front.

The F59PHI locomotive 10, contains a prime engine 12 and a HEP generator 22. SCR unit 1 is mounted to F59PHI 10. Inside SCR unit 1 is where the NOx emissions are reduced. Turbo 6 is mounted to and accepts exhaust gases from prime engine 12 before passing them into main exhaust mixing duct 2. Urea storage tank 7 provides the urea fluid that is injected by injector 4 into the HEP generator 22 exhaust gasses. The HEP generator exhaust gases first flow though DPF 5 and then enter HEP exhaust mixing tube 3. Injector 4 injects the urea fluid into the HEP exhaust flow after it exits DPF 5. The HEP 22 exhaust gases and injected urea are thoroughly mixed as they pass along HEP exhaust mixing tube 3. At the end of HEP exhaust mixing tube 3 the mixture of exhaust gases and urea from HEP generator 22 are injected into the exhaust gases from prime engine 12. These two exhaust streams are allowed to mix as they flow together along the main exhaust mixing duct 2 into SCR unit 1.

In FIG. 1 the HEP generator 22 has a DPF 5 installed, another embodiment of this system would not have a DPF 5 installed and this would not affect the NOx reduction efficiency of the SCR unit 1. This system with SCR unit 1 but not including DPF 5 would be used on a system that was only concerned with reducing NOx emissions or one that consumed a cleaner alternative fuel like natural gas and did not need to remove diesel particulates from the exhaust.

One embodiment of this combined exhaust system has the HEP generator exhaust injected into the rectangular turbine exhaust stack that is just above the prime engine turbocharger. The long dimension of the exhaust stack is aligned from side to side on the locomotive. It would be preferable to inject the HEP generator exhaust into the side of this stack. This area is just after the prime engine turbocharger turbine and is an area of high turbulence and swirl. Directing the HEP exhaust gases horizontally into this area will cause even more turbulence and result in very good mixing of the two exhaust streams.

Another mixing improvement could be to have the nozzle taper down in size where the HEP generator exhaust gasses mix with the prime engine exhaust gases. One embodiment could take a 6 inch exhaust pipe and have it taper down to 4.5 inches, this would almost double the velocity of the incoming HEP generator exhaust flow further increasing turbulence in the mixing area and improving the mixing of the exhaust streams.

Another embodiment could use multiple holes along the sides of the turbine exhaust stack. By having multiple points across the turbine exhaust stack the HEP exhaust will be injected at multiple different points into different parts of the prime engine exhaust flow stream. This will improve the mixing of the flow streams. It could also do this with less back pressure on either of the two engines.

Figure 2:
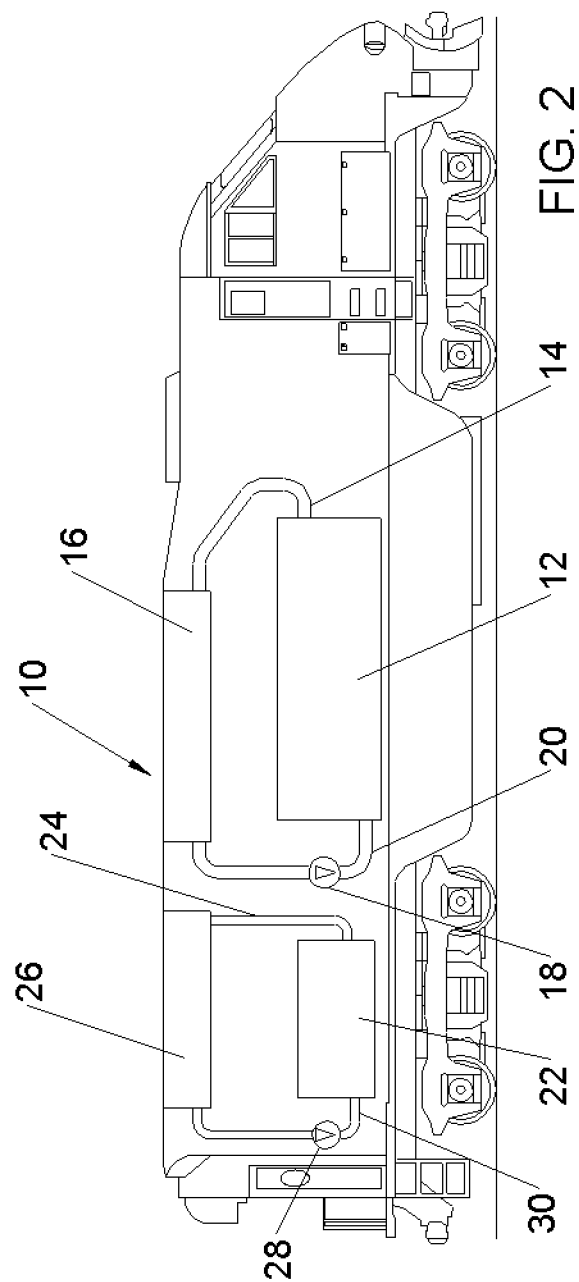
FIG. 2 is a side view of an F59PHI passenger locomotive illustrating the prior art cooling system for the independent HEP and prime engines.

The second portion of the detailed description relates to combined cooling systems for PM emissions compliance and thermal efficiency. FIG. 2 shows a prior art F59PHI locomotive 10 with both a prime engine 12 and a HEP generator 22. The prime engine 12 provides tractive power for propelling the locomotive and the HEP generator 22 provides hotel power for the passenger cars. Heated coolant from prime engine 12 flows through coolant pipe 14 into main radiator 16 where heat is rejected from the coolant to the ambient atmosphere. This cooled coolant now flows back to the prime engine 12 through coolant pipe 20. Coolant pipe 20 has pump 18 installed along it, pump 18 forces the coolant to recirculate thru this closed loop coolant circuit.

A second coolant system is installed with heated coolant from HEP generator 22 flowing thru coolant pipe 24 to the HEP radiator 26. In HEP radiator 26 waste engine heat from the coolant is transferred to the ambient atmosphere. Cooled coolant then flows through coolant pipe 30 back into HEP generator 22. Installed along coolant pipe 30 is pump 28 which forces the coolant to flow thru the closed loop coolant circuit just described.

HEP radiator 26 and main radiator 16 would typically have powered cooling fans to enable the heat transfer to ambient atmosphere, they are not illustrated here as they are common in the art and well understood. Also not included in these figures are means for controlling engine coolant temperature by decreasing or bypassing coolant flow as they are also common in the art and well understood.

Figure 3:
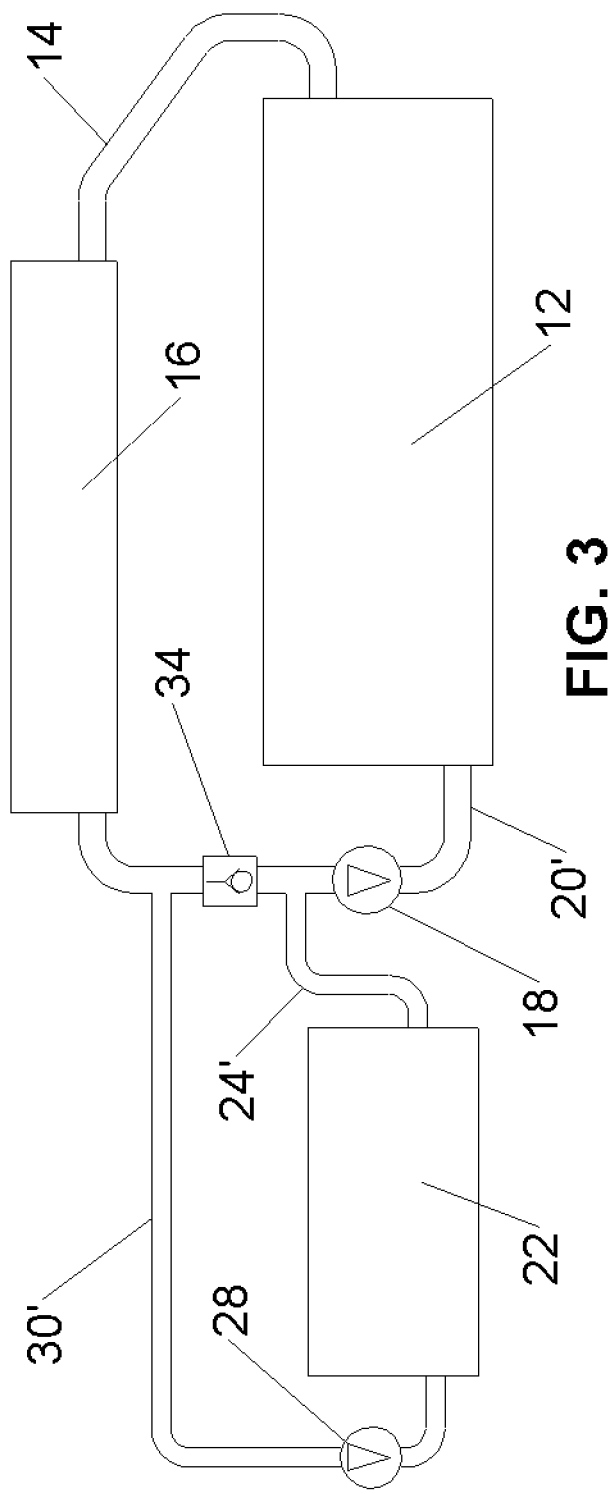
FIG. 3 is a system diagram for an embodiment of a multi-engine locomotive cooling system where a single radiator cools both engines and the smaller engine uses the bigger engine as a heat sink. This is illustrated as a modification of the cooling equipment in FIG. 2

FIG. 3. Illustrates an embodiment of this invention, for clarity F59PHI locomotive 10 is not included in this drawing. Also missing from FIG. 3 is HEP radiator 26 as it is no longer needed with this new plumbing configuration. Added to this system is check valve 34 which is installed along coolant pipe 20' upstream of pump 18. The coolant flow for prime engine 12 is similar to the prior art in FIG. 1 as it flows in a closed loop thru coolant pipe 14, main radiator 16 and back to the engine thru check valve 34 and pump 18 along coolant pipe 20'.

With the removal of the HEP radiator, the heated coolant from HEP generator 22 now flows through coolant pipe 24' into coolant pipe 20'. At this point the heated HEP coolant mixes with the cooled coolant that is flowing back to prime engine 12 thru coolant pipe 20'. These two coolant streams mix together and are forced by pump 18 through prime engine 12. The coolant leaving prime engine 12 now has the waste heat from both the HEP generator and the prime engine. Since the power output of the HEP engine is usually 10 to 20% of the prime engine, this added HEP waste heat mixing with the cooled coolant from radiator 16 is offset by lowering the temperature of the cooled coolant exiting radiator 16.

The cooled coolant exiting radiator 16 flows thru coolant pipe 20'. Some of this flow will go through check valve 34, but a portion of the flow will flow through coolant pipe 30' and pump 28 back to HEP generator 22. This portion of coolant flow will again absorb waste engine heat from the HEP generator and repeat the previous path through prime engine 12 to the main radiator 16.

It is the simple addition of check valve 34 that allows the removal of the HEP radiator and combination of the two coolant systems. Check valve 34 prevents the heated HEP generator 22 coolant that flows through coolant pipe 24' from flowing backwards through coolant pipe 20' and then returning to the HEP generator 22 through coolant pipe 30' without having rejected its waste heat in the main radiator 16.

Future passenger trains are looking at HEP generators with power levels in excess of 600 kW. GoTransit currently specifies 720 kW. When the HEP generator power level and corresponding HEP generator coolant flow rate becomes so large that it is not practical to flow all of the HEP generator coolant through the prime engine, a bypass circuit can be installed around pump 18 and prime engine 12. In this case a only a portion of HEP generator coolant would flow into pump 18 and the remainder would flow from coolant pipe 24' over to coolant pipe 14.

There are many ways to control this bypass flow known in the art, a 3 way control valve is one way. A controlled speed pump that forces the desired amount of HEP generator coolant into pump 18 as the remainder of the HEP generator coolant takes the path of least resistance through the bypass around prime engine 12.

Another embodiment of this concept could be similar to FIG. 3 but have an added heat exchanger to exchange heat from the HEP generator to the prime engine. This added heat exchanger will keep the two engine coolant systems isolated and may be necessary if the two engines require different cooling fluids. Locomotives typically only use water with a corrosion inhibitor additive where HEP generators typically use a glycol based coolant. Coolant pipe 24 would flow heated HEP generator coolant through one side of this added heat exchanger and coolant pipe 20 would flow cooled coolant from radiator 16 through the other side of the added heat exchanger. This would transfer waste heat from the HEP generator coolant to the cooled coolant flowing into the prime engine. The main benefit of this system is the ability to preheat the prime engine coolant or keep the prime engine warm when it is not running. As the prime engine coolant is also cooling the HEP generator, there will be energy savings in the reduction of the amount of power needed in the cooling fan used to cool the HEP generator radiator.

Another embodiment will have the same added heat exchanger as above, but will eliminate the radiator 26 for the HEP generator. In this case heated coolant will be routed through coolant pipe 24, one side of the added heat exchanger and then back to the HEP generator through coolant pipe 30. In this case all of the HEP generator waste heat will have to be absorbed by the prime engine coolant flowing through the opposite side of the added heat exchanger. This system has all of the advantages of FIG. 3 but keeps the two coolant circuits isolated. In this embodiment pump 18 on the prime engine will have to operate even when the prime engine is not operating. In FIG. 3 the pump 18 does not need to operate when the prime engine is off as pump 28 will cause the coolant to flow through pump 18 and the prime engine.

Figure 4:
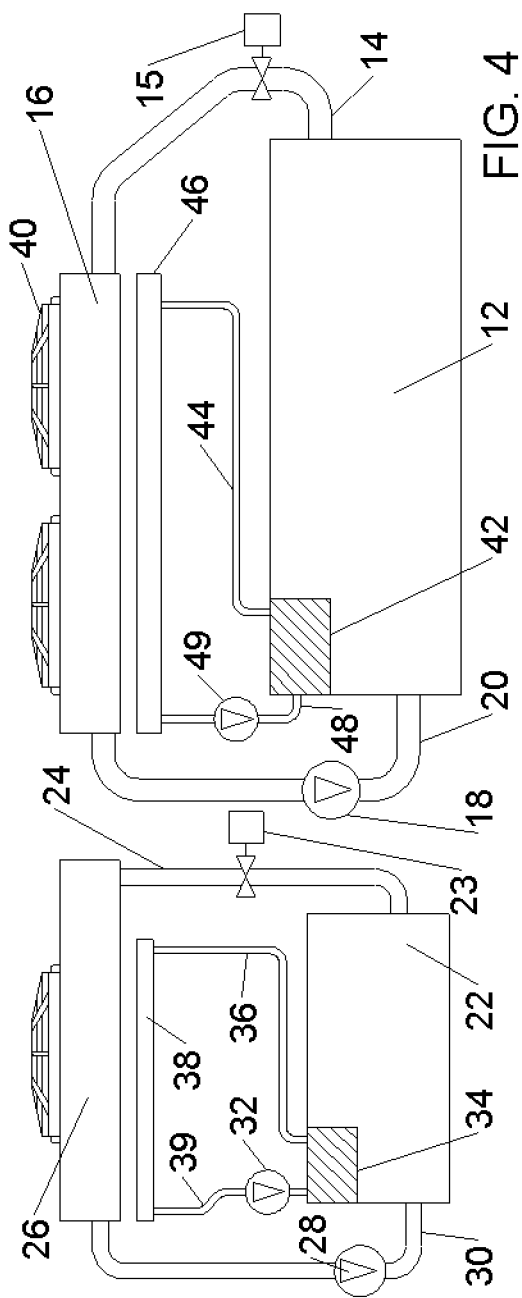
FIG. 4 is a prior art passenger locomotive system with both a high and low temperature cooling circuit for both the HEP generator and the prime engine. In this case both the HEP engine and the prime engine have separate circuit aftercooling.

The third portion of the detailed description relates to combined high temperature and low temperature coolant loops with a thermal reservoir. FIG. 4 is a diagram of a typical prior art passenger locomotive cooling system for both the prime engine 12 and the HEP generator 22. The prime engine 12 provides tractive power for propelling the locomotive and the HEP generator 22 provides hotel power for the passenger cars. Heated coolant from prime engine 12 flows through coolant pipe 14 into radiator 16 where heat is rejected from the coolant to the ambient atmosphere. This cooled coolant now flows back to the prime engine 12 through coolant pipe 20. Pump 18 forces the coolant to circulate thru the closed loop formed by prime engine 12, coolant pipe 14, radiator 16 and coolant pipe 20. In FIG. 4. Pump 18 is mounted in coolant pipe 20, but it could be mounted anywhere in the closed loop and still function. Control valve 15 acts to control the amount of coolant flow and therefore the temperature of the engine. In FIG. 4 control valve 15 is mounted on coolant pipe 14, and similar to pump 18, it could be mounted anywhere in the closed circuit coolant loop and still perform its function. In many instances known in the art, control valve 15 would be part of a bypass loop that allowed heated coolant water to bypass radiator 16 on its way to the inlet of pump 18.

Prime engine 12 has a liquid to air aftercooler 42 which has its own cooling radiator 46. The aftercooler 42 and radiator 46 will use coolant pipes 44 and 48 to form a similar closed loop coolant path as prime engine 12. Pump 49 functions similarly to pump 18 to cause the coolant to circulate through this loop.

One engine having two cooling systems is not uncommon in modern high power diesel engines that are subject to emissions regulations. This is referred to as separate circuit aftercooling and is beneficial in reducing emissions. It is also further beneficial for natural gas engines as it reduces detonation and allows a higher compression ratio and thermal efficiency. These two cooling circuits have to be separate as the aftercooler needs cooled coolant that is as close to ambient temperature as possible, hence the low temperature circuit. The engine coolant on the other hand will still be relatively hot even after flowing through the radiator. It will only drop in temperature enough to dissipate the waste heat from prime engine 12. This circuit is referred to as the high temperature circuit.

Fan 40 draws ambient air through both radiator 46 and radiator 16. It is important that the ambient air pass through radiator 46 on its way to radiator 16 so that the low temperature circuit is cooled with the coldest air.

In a passenger locomotive there will be a second set of high and low temperature cooling systems for the HEP generator 22. HEP generator 22, coolant pipe 24, radiator 26 and coolant pipe 28 form a closed coolant circuit similar to the coolant circuit for prime engine 12. Pump 28 forces to the fluid to circulate in this closed loop and control valve 23 controls the flow amount and temperature. These components are located and function similar to their counterparts on prime engine 12.

HEP generator 22 also has a liquid cooled aftercooler 34. Aftercooler 34, coolant pipe 36, radiator 38 and coolant pipe 39 form a closed loop coolant circuit. Pump 32 forces the coolant to flow in this circuit and could be mounted anywhere in the closed loop circuit. A fan 40 draws ambient air first through radiator 38 and then radiator 26 to reject waste heat to the ambient atmosphere.

This figure describes what a modern coolant circuit will look like when a Tier 4 passenger locomotive is built with both a prime engine and a HEP generator. The current Tier 4 passenger locomotives being proposed no longer use a HEP generator, and will take hotel power from the main engine and convert it to AC using an inverter. Part of the reason for moving away from the separate HEP design is due to the complexity of having 4 separate cooling systems to allow both diesel engines to meet Tier 4 emissions levels.

Figure 5:
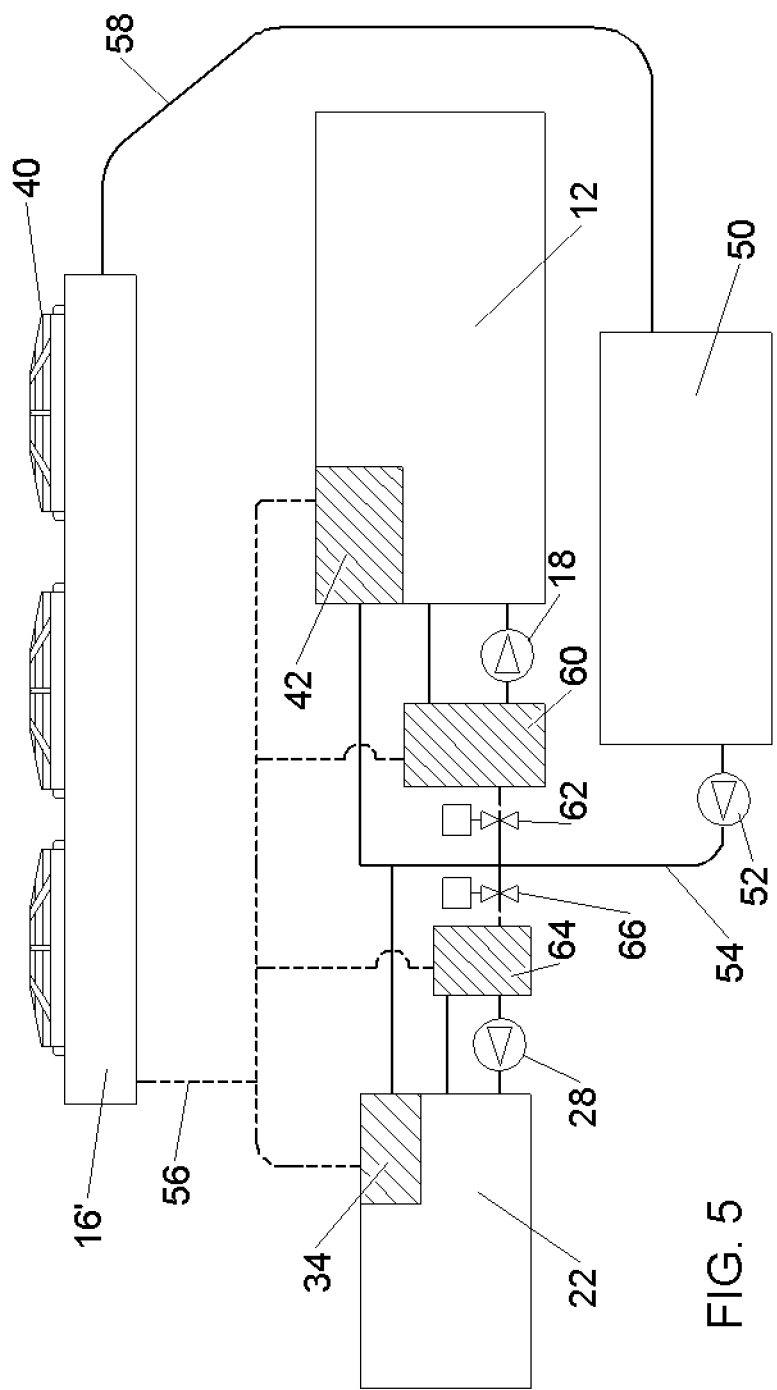
FIG. 5 is a system diagram of a multi-engine locomotive cooling system that has a single radiator and a thermal transient reservoir.

FIG. 5 illustrates an embodiment of the transient thermal reservoir. This system cools both the prime engine 12 and the HEP generator 22. As in FIG. 4, each of these also has a low temperature circuit for the aftercooler and a high temperature circuit for jacket water cooling.

Compared to the system in FIG. 4, this system has one less pump and eliminated 3 of the 4 original radiators. Added to the system is thermal reservoir 50 which is basically a tank of fluid. If water is used to absorb the thermal energy, 1000 gallons of it would weigh 9000 pounds and would absorb 173 HP continuously for an hour with only a 60 degree F. rise in temperature. Put in perspective, most locomotives carry in excess of 3500 gallons of diesel fuel and most passenger trains have enough clear space below the frame to add an additional 1000 gallon water tank which would be less than 5 feet long.

This system is one large closed loop low temperature coolant circuit formed by thermal reservoir 50, coolant pipe 54, coolant pipe 56, radiator 16', and coolant pipe 58. Coolant travels from coolant pipe 54 to coolant pipe 56 through a pair of control valves and four heat exchangers. Coolant pipe 54 forms a pressurized manifold of low temperature coolant that will supply coolant to any of the waste heat sources that need cooling.

The waste heat sources are prime engine 12 and its aftercooler 42 plus the HEP generator 22 and its aftercooler 34. Because the thermal reservoir 50 is a low temperature circuit and the jacket water cooling of prime engine 12 and HEP generator 22 need a high temperature circuit. Each will have its own closed coolant loop and a heat exchanger. There is a closed loop coolant circuit between Prime engine 12 and heat exchanger 60. Pump 18 forces the fluid to circulate in this closed loop circuit. This pump should be the standard mechanically driven engine coolant pump, but it could also be an electric pump added for additional system control. Heat exchanger 60 is an interface between the high temperature coolant circulating in the prime engine 12 coolant circuit and the low temperature coolant being supplied by thermal reservoir 50. Control of how much waste heat is removed from prime engine 12 is controlled by control valve 62. As control valve 62 allows more cooled coolant to flow from coolant pipe 54 more waste heat will be removed from the high temperature coolant flowing in the prime engine 12 coolant circuit. After the low temperature coolant passes through heat exchanger 60 it enters coolant pipe 56 where it flows to radiator 16' to reject its waste heat to the ambient atmosphere. Because aftercooler 42 is a low temperature heat exchanger, it will not need an interfacing heat exchanger and will take low temperature coolant directly from coolant pipe 54. There is no control valve needed for aftercooler 42 as the goal is to have the coldest intake air possible.

HEP generator 22 has a similar coolant circuit design as prime engine 12. Aftercooler 34 transfers waste heat to cooled coolant that it receives from coolant pipe 54. This now heated coolant is sent to radiator 16' to reject the waste heat. Heat exchanger 64 is used to transfer waste heat from HEP generator 22 to the cooled coolant in the low temperature coolant loop. One half of heat exchanger 64 and HEP generator 22 form their own high temperature closed loop coolant circuit. Pump 28 recirculates the coolant in this loop. On the other side of heat exchanger 64, control valve 66 manipulates the amount of cooled coolant that flows through heat exchanger 64, thereby controlling how much jacket water waste heat is removed from HEP generator 22.

Heat exchanger 64 and HEP generator 22 form one independent closed loop high temperature coolant circuit, heat exchanger 60 and prime engine 12 form another independent high temperature closed loop coolant circuit. Thermal reservoir 50 coolant pipes 54, 56, 58 and radiator 16' form an independent low temperature closes loop coolant circuit. This makes it possible to use different fluid compositions in three different closed loops. For most EMD locomotive retrofits is most likely that the low temperature loop and the prime engine 12 high temperature loop will operate with water as the coolant fluid and the HEP generator 22 high temperature circuit will run a glycol water mixture. It will be possible for any two loops operating on the same fluid to share a header supply tank if needed.

As a technique to reduce the energy consumption of powered cooling fans 40 and thereby save fuel, the powered fans will be operated at reduced power levels, possibly at less than 15% of rated power. When the locomotive is accelerating at full throttle radiator 16' will not be able to reject all of the waste heat at this reduced cooling fan power. This will cause the coolant temperature in thermal reservoir 50 to rise during acceleration. After acceleration when the prime engine is at lower loads this reduced cooling fan capacity will be more than enough to reject the currently produced engine waste heat and at that point the coolant temperature in thermal reservoir 50 will start to drop. When the locomotive is stationary and the prime engine is at idle, the fluid temperature in reservoir 50 will drop even faster. If the distance between stops was long enough, the powered cooling fans may not even operate during the stop. Temperature control in reservoir 50 is controlled by manipulating the power input to the powered cooling fans. If sustained high load operations are happening such as climbing a long grade, the temperature in reservoir 50 may rise excessively. As the control system notices this rise in thermal reservoir 50 temperature it can incrementally increase fan power to keep the peak temperature under a certain threshold where higher thermal reservoir 50 temperatures would negatively impact either the engine emissions or the rated power level of the engines when operating on natural gas.

The benefits of this system are a possible 2% savings in fuel consumption by reducing the energy consumed by the powered cooling fans. Also this system allows having a low temperature loop and high temperature coolant loop for both engines using only one radiator. The prime engine will no longer be subject to a slug of cold water from the radiator at restart after sitting for a while.

Figure 6:
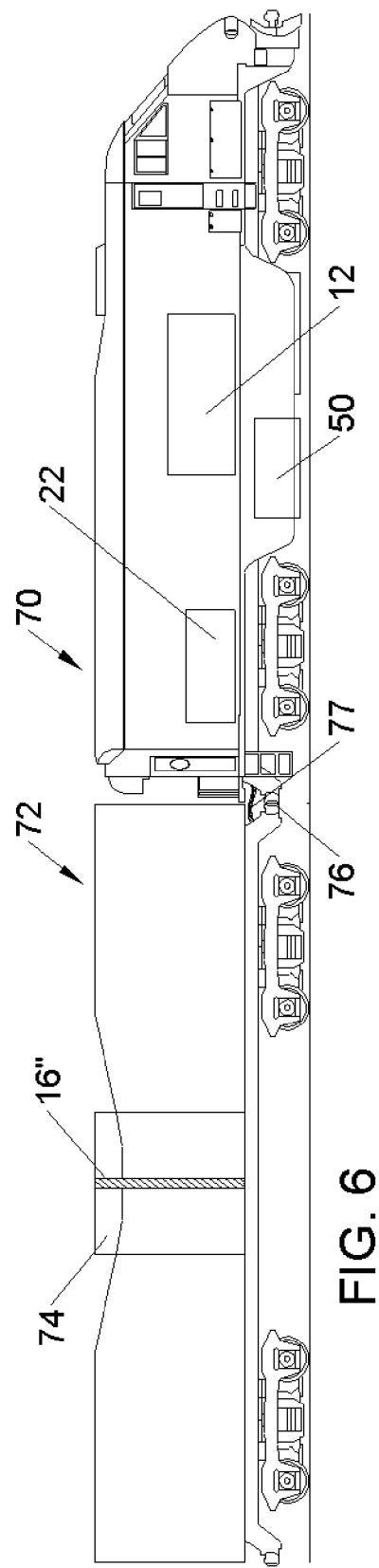
FIG. 6 is a side view of an F59 passenger locomotive to an advanced tender that incorporates bidirectional ram air cooling.

FIG. 6 illustrates the use of a thermal reservoir system with a tender car which further reduces fuel consumption by using ram air cooling instead of powered cooling fans when the locomotive is as speed. Now that ram air cooling is practical, waste heat recovery can be implemented which further reduces fuel consumption and increases available power. Locomotive 70 is coupled to tender 72. On locomotive 70 is prime engine 12, HEP generator 22 and thermal reservoir 50. Locomotive 70 will have the various configurations of heat exchanger, control valves and piping equipment that were previously described in FIG. 5 except for elimination of radiator 16' and cooling fans 40. The coolant that would have flown through radiator 16' now flows through radiator 16" on the tender car. To achieve this, coolant pipe 56 would connect to tender car coolant connector 76 taking the heated coolant to radiator 16", and then coolant pipe 77 would return the coolant to coolant pipe 58 on the locomotive thus completing the closed coolant loop. The coolant pipes 76 and 77 on tender car 72 would have a flexible section needed to allow movement between the locomotive 70 and tender car 72. Only one coolant pipe 76 or 77 is shown as they would be side by side. This version of the tender car is designed for ram air cooling with duct 74 allowing the airstream to flow through radiator 16". Radiator 16" could also be a conventional radiator similar to radiator 16', but mounted in the roof of the tender car. In this case radiator 16" would then need a set of cooling fans 40 to force the cooling air through it. Even in the case of a ram air cooling system configuration, there will likely be some kind of powered fan system for cooling at extended low speed operation or possibly climbing long hills.

In order to make efficient use of the ram air cooling, it is required to incorporate the combined closed loops as implemented in FIG. 5. In FIG. 5 the powered fans can pull the ambient air through the radiators in the proper order at all times because the fans always move the air in one direction. In the bidirectional tender car, it both a high temperature and low temperature radiator is used; it is not possible to stack the radiators and insure that the ram air goes through the low temperature radiator first. If the ram air goes through the high temperature radiator first, the low temperature radiator will be less effective because the incoming cooling air will be heated up already. The likely solution would be to put the low temperature and high temperature radiators side by side, in this case the cooling air will only pass through one radiator and therefore twice as much cooling air will be required.

Another benefit of the combined low and high temperature circuits is only needing one pair of coolant lines between locomotive 70 and tender car 72. If the high and low temperature circuits were independent then four coolant lines would be needed.

The installation of powered cooling fans poses a challenge for tender cars that are designed to use ram air cooling. Because locomotives and tender cars can travel in two directions, a ram air cooling system has to be bidirectional. Powered cooling fans designed to be efficient are only efficient in one direction. These fans will suffer poor efficiency if they are spun backwards to reverse the fan flow. Also if these fans are always present in the ducting, when not in use they will reduce the efficiency of the ram air ducting requiring either larger inlets and ducts or higher speeds to get effective cooling.

One solution is to have the fans installed in a panel that can rotate about its center axis so that its wide dimension is positioned parallel to the cooling air flow when powered fans are not needed. This also allows the fan panel to rotate 90 degrees in each direction so that the powered cooling fans can provide cooling air flow in either direction depending on the tender car direction of travel.

This method of pivoting the fan panel solves the bidirectional problem and the ram air duct blockage issue when powered fans are not needed. There is still a further problem in that powered fans cannot be used at low speeds to augment ram air cooling flow. There will be a speed range from just above stationary up to the speed where there is enough ram air supplied cooling to absorb the required waste. In this speed range it would be beneficial if the powered fans could be deployed and only use enough power to augment the ram air. Unfortunately when the fan panel rotates into position it will significantly reduce the flow amount of ram air provided by the trains velocity through the air, because of that the fans will have to operate at a much higher power setting than would otherwise be needed just to augment the ram air flow thus reducing the energy savings of the ram air cooling system.

This is less an issue for commuter locomotives that will use a thermal reservoir and more an issue for freight locomotives that may travel at lower velocities for a longer period of time at high power such as when climbing a hill.

There is a novel way to do the powered cooling that eliminates the rotating fan panels for the bidirectional ram air cooling and at the same time allows the powered fan system to augment the ram air supply at lower speeds. Instead of the fans moving all of the air in the duct, the fan supply could be ducting into an air amplifier system. This would function something like a Dyson AM2 air multiplier home fan. This would use pressurized air being forced though small slits in the duct walls to flow over a curved surface using the coanda effective to entrain more air and assist in driving the ram air supply through the duct. In this system smaller fans supply less air mass at a higher pressure to be ejected out of these slits at a high velocity. It is this high velocity air that transfers some of its kinetic energy to the air around it, hence amplifying its own air flow. Using the Dyson AM02 tower fan as an example these slits could be designed into the duct wall, and additional stationary panels that are parallel to the air flow could have additional slits to create multiple air amplifiers across the width of the duct.

The slits will efficiently work in one direction, and when the airflow is traveling in the opposite direction, the slits will offer negligible resistance to the opposing air flow. This allows the powered cooling system to be efficiently used from very low power up to maximum power. By using air shut off valves to control the flow to individual slits or groups of slits, the slits can be brought into action a few at a time which allows them to run at high velocity, but only use enough fan power to supply the needed number of slits.

For powered fan cooling in both directions, one set of slits will be designed to amplify air in each direction. A single fan could supply the pressurized air for all of these slits. The direction of effective cooling air flow could then be controlled by one large three way valve that either supplies one cooling direction or the other. It could also be multiple shut off valves with only the particular valves opening for the correct direction and also only the number of valves opening for the number of same direction slits needed for desired total cooling air flow.

This same multiple slits along the duct walls and additional panels with multiple shut off valves could be used in the ram air ducting on the roof of a transit bus, but this system will only need slits that amplify air in one direction.

Figure 7:
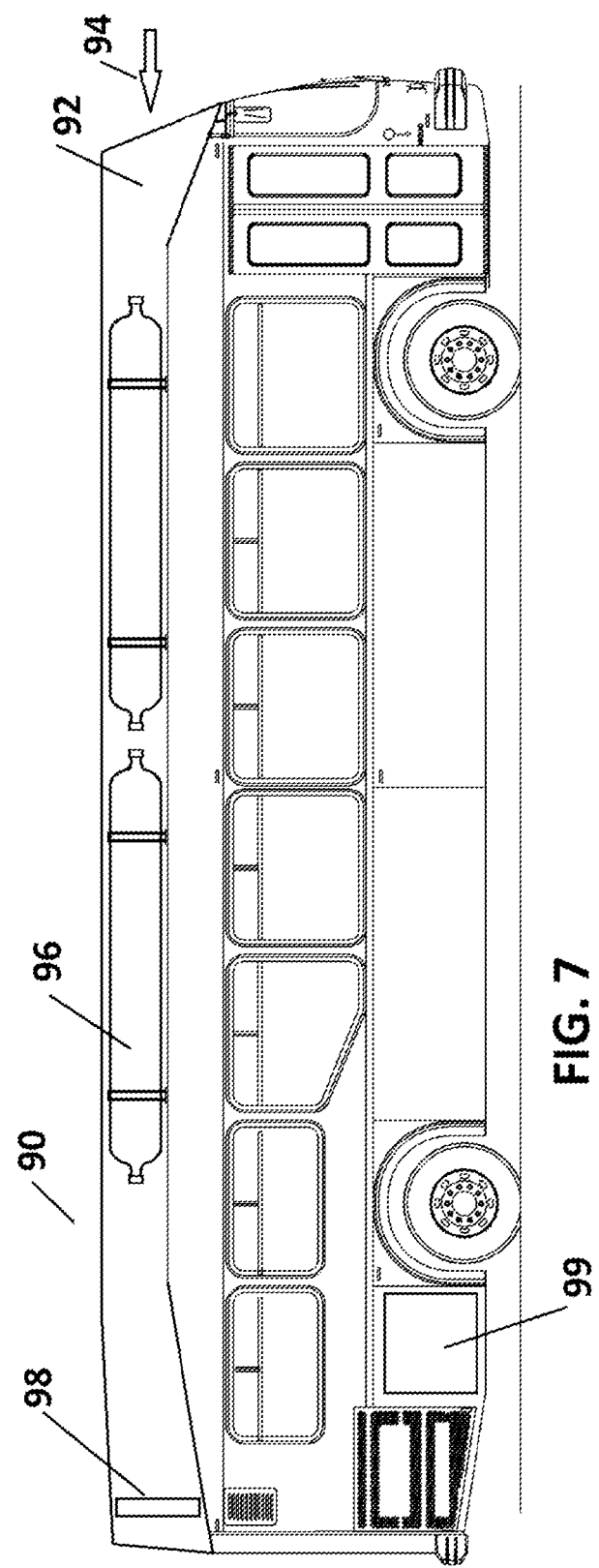
FIG. 7 is a side view of transit bus that incorporates a thermal transient reservoir and ram air cooling.

FIG. 7 illustrates the concept of using a thermal reservoir 99 on a transit bus 90. Transit busses are another stop and go application where a thermal reservoir system could save significant energy by decoupling the time where it is cooling the thermal reservoir fluids at higher speeds while generating more waste heat at lower speeds when accelerating. Because transit busses also have to operate an air conditioning system condenser with a powered fan, the wasted energy for a transit bus can be 10% or higher of the fuel consumed.

In order to make a thermal reservoir work on a transit bus with ram air cooling, an overhead duct system 92 would be employed with ram air 94 entering from the front of the bus due to forward velocity. The height of this duct system is not a clearance issue for transit busses as they typically store CNG cyclinders on the roof. In order to allow airflow through duct system 92, the CNG cylinders are stored length wise along the direction of the air flow. Typically they are stored from left to right which would block off the air flow. Radiator 98 would be towards the end of the duct system 92. The thermal reservoir 99 would most likely be mounted under the floor of the bus where it would have the least effect on the bus center of gravity.

This is another example of where a thermal reservoir makes practical both the application of ram air cooling and waste heat recovery. If the waste heat recovery system had to be cooled by a powered fan it would expend most of its recovered energy in fan power. This combination of ram air cooling and waste heat recovery would be a good fit with a hybrid bus. In a hybrid bus, the engine and the waste heat recovery system would operate at a near constant load and high efficiency with the hybrid system taking care of the transient loading of the bus and the thermal reservoir dissipating the remaining waste heat at higher average speeds.

This system could also be implemented as a ram air cooling system without the thermal reservoir using the slit cooling system to increase air flow at a stop or low speeds. With the thermal reservoir the powered slit cooling system would be rarely used. Without the thermal reservoir, the powered fan would cycle frequently. A system with a small thermal reservoir would cycle the powered cooling fans less often. In the transit bus without a thermal reservoir, the high temperature and low temperature circuits can have their own radiators because the air flow is always in one direction and the radiators can be stacked appropriately.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A system in which passenger locomotive HEP and prime engine exhaust merge into a single main SCR system for lower emissions comprising:
   a head-end power (HEP) generator creating HEP generator exhaust;
   a prime engine creating prime engine exhaust;
   a selective catalytic reduction (SCR) unit through which the prime engine exhaust and the HEP generator exhaust run;
   an HEP generator exhaust pipe running from the HEP generator to an exhaust mixing duct where the HEP generator exhaust is mixed with the prime engine exhaust, wherein the HEP generator exhaust pipe discharges into the exhaust mixing duct at a distance from the SCR less than ten times the diameter of the exhaust mixing duct; and
   a single urea injector injecting urea into the HEP generator exhaust pipe at a distance from the exhaust mixing duct of more than ten times the diameter of the HEP generator exhaust pipe.

* * * * *